S. SPOOR.

Domestic Boiler.

No. 87,306.

2 Sheets—Sheet 1.

Patented Feb. 23, 1869.

Witnesses
J. Beale.
R. S. Turner

Inventor
Stephen Spoor
By his Attorney
J. S. Brown

S. SPOOR.
Domestic Boiler.
No. 87,306.
2 Sheets—Sheet 2.
Patented Feb. 23, 1869.
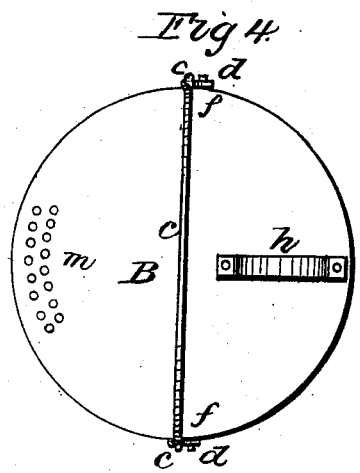
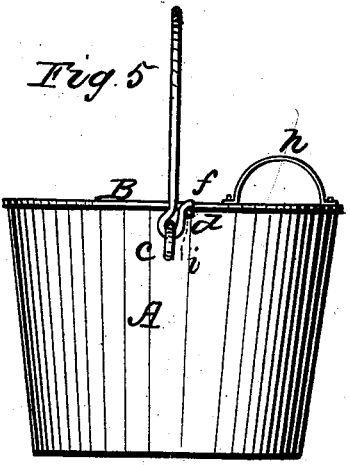
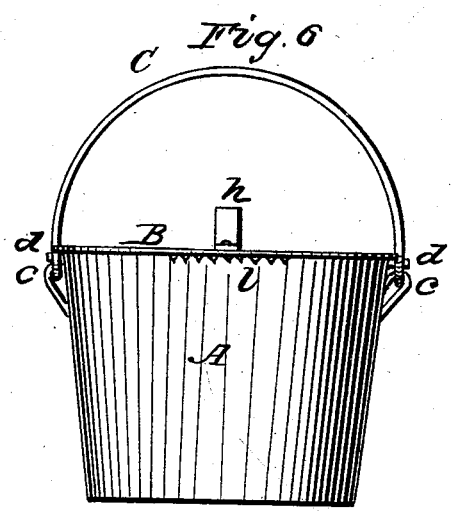
Witnesses
F. Beale
R. S. Turner
Inventor
Stephen Spoor
By his Attorney
J. S. Brown

United States Patent Office.

STEPHEN SPOOR, OF PHELPS, NEW YORK.

Letters Patent No. 87,306, dated February 23, 1869.

IMPROVEMENT IN BOILING-KETTLES.

The Schedule referred to in these Letters Patent and making part of the same.

*To all whom it may concern:*

Be it known that I, STEPHEN SPOOR, of Phelps, in the county of Ontario, and State of New York, have invented an Improved Boiler or Kettle for Cooking; and I do hereby declare that the following is a full and exact description thereof, reference being had to the accompanying drawings, making part of this specification—

Figure 1:
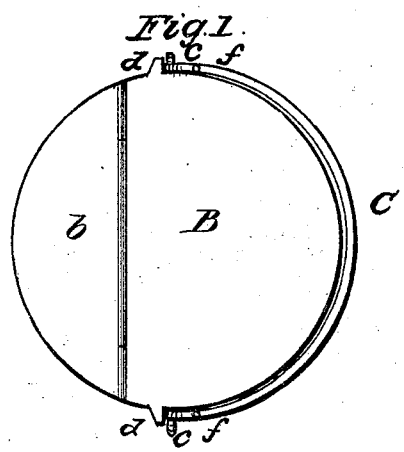

Figure 1 being a top view of the boiler or kettle.

Figure 2:
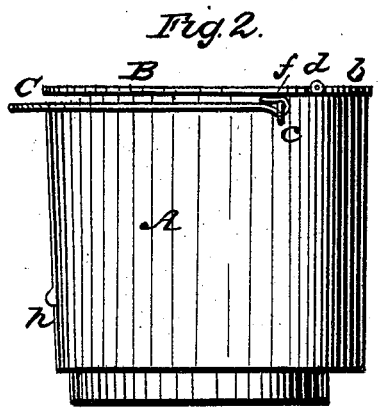

Figure 2, a side view thereof, when in an upright position, as in use.

Figure 3:
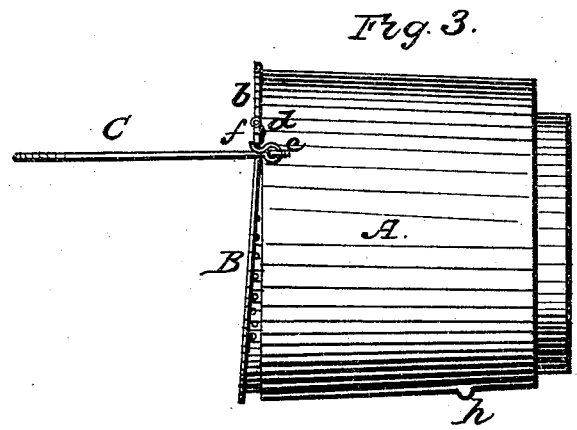

Figure 3, a side view of the same in a tilted position, as when pouring off water from it.

Figures 4, 5, and 6, respectively, top, side, and front views of the improved kettle or boiler, when arranged with a removable cover.

Like letters designate corresponding parts in all the figures.

My invention consists in providing the boiler, kettle, or similar vessel, with a cover or lid, so constructed and arranged, in connection with the bail of the boiler or kettle, that, when the bail is raised, in lifting and suspending the boiler A, it holds the lid nearly or quite shut, but so as to allow the water to drain out, without allowing the vegetables or food in the vessel to fall out; and, when the boiler is resting on the stove, and the bail down, the cover is free to be opened and closed, or removed, in the ordinary way.

Let A, in the drawings, represent a culinary boiler or kettle, which may be made in any usual way, except the lid B, which, as represented, is hinged to the ledge $b$, partially covering the top of the vessel, or otherwise, in any manner, at one side of the journals $c\,c$ of the bail C, so that it will extend under the bail when the latter is raised vertically.

This cover is of such a width that the bail will rise freely outside of its edge, from its front side, till the bail reaches a vertical position, when it strikes shoulders or projections, $d\,d$, on the edge of the cover, and cannot be moved further in that direction.

There are also, on that side of the bail, projections, notches, or shoulders, $f\,f$, just enough above the cover, when in a vertical position, to allow the cover to move up a very little above the boiler or kettle, as shown in fig. 3.

The extent to which the cover is allowed to open is only sufficient to permit the water to drain off readily, and not allow the vegetables, like potatoes, peas, &c., to escape.

In order to make its action still more perfect and certain, while allowing the water to drain off, a flange, $g$, of perforated tin or other metal, may be secured to the bottom of the lid, so as to shut inside of the vessel, and cover the open space between it and the lid, when the latter is raised by the bail, in tilting.

One shoulder or projection, $d$, would serve the purpose, but not so perfectly as one on each side.

When the bail is down at the side of the vessel, the cover may be raised and closed without impediment.

Two important purposes are joined by this invention, besides that of allowing the water to drain off, and to retain the articles within:

First. The closed cover prevents the steam from scalding the hands, in handling the boiler or kettle.

Second. The boiler can be tilted and emptied by simply leaning it against any support, and merely holding the bail, thus avoiding the burning and cracking the hands.

There may be a notch, $h$, or a projection, on the front side of the kettle, to bear on the edge of any vessel into which the water is to be drained, and prevent the kettle slipping off.

Figs. 4, 5, and 6, show how the invention is applied when the cover is not hinged to the boiler or kettle, but is removable therefrom.

The lid B, which may be a simple disk of sheet-metal, a little larger than the top of the vessel, so as not to sink down into the same, has two projecting wires, or lugs, $d\,d$, on opposite edges, the said lugs forming supports for the cover to rest in notches $i\,i$, fig. 5, in the sides of the kettle, just behind the bail, and thus also furnishing guides to keep the cover in place. They also serve as the projections for the bail C to bear upon, for holding the cover on, while draining the vessel, as indicated in the same figure.

I prefer to turn the extremities $f\,f$ of the bail-rod, which form the bail-loops, or eyes, outward, as represented at $f\,f$ in figs. 4 and 5, so as to bear on the lugs, or projections, $d\,d$, thus rendering them of easy construction when the bail is made, and adding nothing to the cost thereof.

The handle $h$ of the cover may be situated near the rear edge of the same, in order to indicate which way to tilt the kettle, that the bail may hold the cover on.

The cover might be held in position on the kettle or boiler by other means than the projections $d\,d$, as by an entering flange, on the under side, fitting in the kettle, in which case the ends, or projections, $f\,f$, of the bail may be turned inward, so as to bear on the edges of the cover, and hold it in place; but I prefer the use of the projections $d\,d$ and notches $i\,i$, especially as this construction allows the bail to turn freely both ways when the cover is off.

This method of holding on an unhinged cover does not readily allow the water to drain out between its edge and the top of the kettle or boiler; but, in such case, there may be notches $l$ in the upper edge of the kettle, for that use, as indicated in fig. 6, or there may be perforations $m$ near one edge of the cover, as shown in fig. 4.

What I claim as my invention, and desire to secure by Letters Patent, is—

The construction and arrangement of the cover and bail of a boiler, kettle, or other similar vessel, in such a manner that the bail, when raised and tilted, will hold the cover nearly or quite closed, leaving an open space, or spaces sufficient to allow the water to drain off without spilling the contents of the vessel, substantially as and for the purpose herein specified.

Also, the notches, or perforations, $l\,m$, in the edge of the kettle or cover, or both, for the purpose herein specified.

STEPHEN SPOOR.

Witnesses:
    EDM. F. BROWN,
    J. S. BROWN.